Patented July 6, 1937

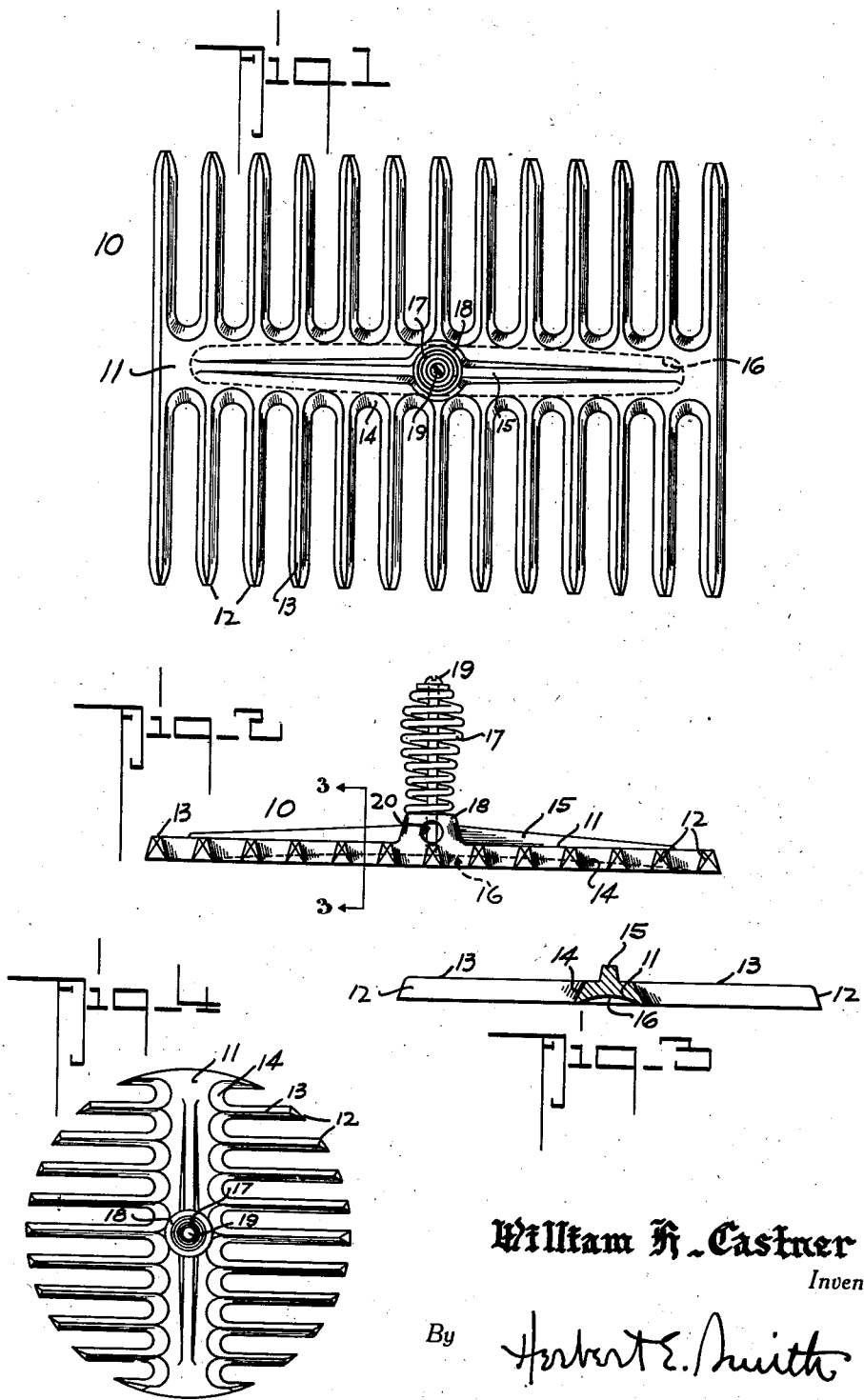

2,086,155

UNITED STATES PATENT OFFICE 2,086,155

COOKING GRID

William H. Castner, Spokane, Wash.

Application September 14, 1936, Serial No. 100,581

5 Claims. (Cl. 53—5)

My present invention relates to improved cooking grids for frying of foodstuffs, especially of meats, such as steaks, or bacon, and of various other forms of foods, such as hamburgers, fish fritters, and any form of flat food matter that is usually cooked in a pan or as is done in restaurants, directly upon the top plate of the stove.

While the primary purpose of my invention is to apply weight to cooking foods to prevent curling or warping of the food it is also a purpose to add an attractive appearance to food by contrast effects in the color of the food when served, this being accomplished by spaced fingers which sear where they contact the upper face of the meat or food.

The device of my invention also lends itself to the making of toast, to prevent curling, as well as to prevent the curling of meats and other foods.

The invention involves certain novel features of construction and arrangements of shapes and form to meet the purpose of my invention and consists essentially in a grid-like formation that will rest directly upon the food being cooked, usually by the fry method.

I also provide means for handling the grids of my construction in a ready manner. The grid is especially adapted to start cooking of foodstuffs, especially of meats, the minute that it is placed on top of the food. Normally it is proposed that the grids will be on the stove tops and in a hot condition, a condition equally hot with that of the stove top so that when a steak is placed on the stove and the grid applied to the top side of the steak, cooking will start at once on both sides, helping materially in maintaining the natural juices in the meat within the meat and, at the same time, giving a ribbed effect to the surface of the steak for appearance's sake.

In the accompanying drawing I have illustrated one complete example of the physical embodiment of my invention, wherein the parts are combined and arranged according to one mode I have thus far devised for the practical application of the principles of my invention, but it will be understood that changes and alterations may be made in the exemplified structures, within the scope of my claims, without departing from the principles of the invention.

Figure 1 is a plan view of a rectangularly shaped grid of my construction.

Figure 2 is an elevation thereof.

Figure 3 is a vertical cross section taken on the lines 3—3 of Figure 2.

Figure 4 is a circular form of the same device.

In order that the general arrangement and relation of parts and the utility of parts may be readily understood I have indicated a typical grid having a flat face that may be milled or otherwise finished in manufacture so that it will rest fully upon the top plate of a stove or within a frying pan or other vessel.

Generally speaking, the grid consists of a pronged or fingered plate 10 having a longitudinally extending center bar 11 from which extend in opposite directions and in the same plane a series of fingers or prongs 12. These prongs are finished on their underside and are narrowed on their top side as 13 in order that they may lend themselves readily to washing or cleaning after use. The fingers therefore in cross section have a bevel extending from their top face to their bottom face and are engaged with the bar 11 so that a round connection is made therewith which is also beveled as 14. Located centrally on the bar on the upper side is a tapering rib 15 to give strength and weight to the structure to prevent warping and permit of ordinary rough handling in use. On the lower face of the bar as 16 this bar is hollowed so that there is substantially little contact with the steak or other food upon which the grid is rested.

Centrally of the bar is located a handle member 17 preferably of a type that will readily dissipate heat and that will not be normally too hot to pick up in the hands when the grid is in use. The handle 17 is secured to a raised boss 18 and secured therein by a screw 19 which serves as a substantial and fixed support for the handle which in the present instance is indicated as being made of formed wire.

Other means of lifting the hot grid or to place it wherever it is desired may involve the elimination of the handle 17 and the use of the usual stove lid lifter inserted into the aperture 20 which may be provided substantially to fit the point of the lifter.

While I have shown and described generally the structure shown in Figure 1 of my drawing I have indicated in Figure 4 the circular type and it is possible that I will adopt other shapes such as elliptical, square, or any other form suitable for certain specific work. It is to be understood that the greatest extent of use of such a grid as I have devised will be in restaurants, hamburger stands, and places serving food in a quick manner. By keeping the grids on the stove prior to use so that they approximate the heat of the cooking plate, it is possible to deliver steaks in a fine condition with their normal juices intact and to cook them so much more rapidly and to provide an attractive pattern on the upper side of the steak on account of the differences between the portion of the steak or other food contacted by the hot fingers of the grid in contrast with the area not so contacted.

Owing to strength requirements I have designed the bar 11 of sufficient width to properly support the fingers 12 against breakage or warpage and in order that too much of the bar shall not contact the food I have devised a hollow underside of the bar as 16 in order to carry out the ribbed or design effect desired in the foods when served.

Having thus fully described my invention, what I claim as new and desire to secure by Letters Patent is:—

1. In a cooking grid, a central longitudinal bar, fingers extending outwardly on each side of the bar and in spaced relation with each other, a handle supported centrally of the bar and extending vertically therefrom.

2. In a cooking grid, a central longitudinally extending bar, a series of fingers extending at right angles from said bar and formed integral therewith, a central boss on the upper side of the bar and a handle secured thereto, ribs extending from said boss in the direction of the ends of said bar, and a hollow formed in the under face of said bar.

3. In a cooking grid, a longitudinally extending bar, fingers extending therefrom, said fingers being beveled and a bevel extending from the fingers around and connecting with the bar, a central boss projecting from said bar on the upper side, means in said boss for lifting the grid, ribs extending from the boss toward the end of the bar, and a hollowed underside in said bar extending to a point near the ends of said bar.

4. In a cooking grid, a central longitudinal bar, beveled fingers extending outwardly on each side of the bar and of such length as to form a substantially circular grid or plate, handle means on the upper side of the bar, reinforcing ribs extending across the top of the bar, and a depression on the underside of the bar.

5. In a cooking grid, a rack-like structure having spaced parallel fingers and joined to a central bar, said fingers being beveled and said bar being beveled at the junction with the fingers, a central boss and handle means thereon, ribs formed on the upper side of the said bar and a recess formed in the lower side of said bar substantially from end to end.

WILLIAM H. CASTNER.